(12) United States Patent
Morisaki et al.

(10) Patent No.: US 7,570,375 B2
(45) Date of Patent: Aug. 4, 2009

(54) PRINTING SYSTEM (75) Inventors: Hiroshi Morisaki, Aichi-ken (JP); Masatoshi Kokubo, Aichi-ken (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 659 days.

(21) Appl. No.: 10/228,291

(22) Filed: Aug. 27, 2002

(65) Prior Publication Data
US 2003/0053104 A1 Mar. 20, 2003

(30) Foreign Application Priority Data
Aug. 28, 2001 (JP) ............... 2001-257691

(51) Int. Cl.
G06F 3/12 (2006.01)
G06K 15/00 (2006.01)
H04N 1/46 (2006.01)
H04N 1/00 (2006.01)
H04N 1/40 (2006.01)

(52) U.S. Cl. .............. 358/1.13; 358/1.16; 358/1.18; 358/500; 358/3.24; 358/401

(58) Field of Classification Search .............. 358/1.15, 358/406, 1.13, 1.16, 1.18, 3.24, 500, 401; 710/8; 709/217; 347/101, 106, 14
See application file for complete search history.

(56) References Cited

U.S. PATENT DOCUMENTS

| 5,081,595 | A | * | 1/1992 | Moreno et al. ............. 358/1.12 |
| 6,291,829 | B1 |   | 9/2001 | Allen et al. |
| 6,425,650 | B1 | * | 7/2002 | Walker et al. ................. 347/14 |
| 6,850,337 | B1 | * | 2/2005 | Anderson et al. .......... 358/1.15 |

FOREIGN PATENT DOCUMENTS

| JP | A-6-171161 | 6/1994 |
| JP | A-9-30073 | 2/1997 |
| JP | A 11-170678 | 6/1999 |
| JP | 11316669 A * | 11/1999 |
| JP | A 2000-301805 | 10/2000 |

\* cited by examiner

*Primary Examiner*—Edward L Coles
*Assistant Examiner*—Thomas J Lett
(74) *Attorney, Agent, or Firm*—Oliff & Berridge, PLC (57) ABSTRACT

A printing system includes a printing device and a controlling system. The printing device is capable of printing images on a recording sheet. The printing device includes a first sheet type setting system that sets first sheet data representing a type of the sheet. The controlling device is capable of communicating with the printing device, and includes a second sheet type setting system that sets second sheet data representing a type of the sheet. The printing system further includes a comparing system that compares the first sheet data with the second sheet data. The printing device performs the printing operation in accordance with a comparison result of the comparing system.

12 Claims, 8 Drawing Sheets

PRINTING SYSTEM

BACKGROUND OF THE INVENTION

The present invention relates to a printing device, and a printing system including the printing device and a controlling device such as a computer connected to the printing device.

Conventionally, a printing system including a personal computer and a printing device connected to the personal computer has been known. In such a system, by running application software such as a word processing program, a drawing program and the like, text data, graphic data and the like is created. The created data is transmitted from the personal computer to the printing device, which prints out the data.

In such a system, a device driving program for controlling the printing device (hereinafter, such a program will be referred to as a printer driver) connected to the personal computer should be installed in the personal computer.

The printer driver is provided for individual printer, and it functions to convert data created by the application software to print data suitable for the printing device driven by the printer driver. Typically, with the printer driver, various pieces of data Including functions of the printing device, interface data, font data, control codes and the like can be set.

Recently, some printing devices are provided with sheet type setting units, with which a sheet type, e.g., quality of recording sheet (e.g., normal paper, paper for inkjet printer, glossy paper, OHP paper or the like), size of the recording sheet and the like can be set.

In particular, inkjet printing devices generally perform printing operation in different manner depending on the quality of the recording sheet. For example, a color printer utilizing cyan, magenta, yellow and black inks uses only the black ink when it prints out a black image on the normal paper. However, when a black image is formed on the glossy paper, the printing device uses only the cyan, magenta and yellow inks and dose not use the black ink. It is because the black ink does not dry quickly on the glossy paper, and the quality of the image is deteriorated if the black ink is used for the glossy paper.

If a printing system is constituted by the personal computer and the above-described printing device having the sheet type setting unit, some of the items of the sheet type data can be set either by the printing device or the personal computer (printer driver). Such a configuration is sometimes troublesome since a user may not know which setting is effective when a print operation is performed.

For example, if the setting in the printing device has priority, even through the user sets sheet type data using the printer driver on the personal computer, a printing operation is carried out in accordance with the setting in the printing device. If the setting in the personal computer has priority, then a printing operation is performed in accordance with the setting of the printer driver regardless whether the user changes setting on the printing device. Thus, intention of the user may not be reflected when the printing operation is performed, and a desired printout may not be obtained.

In particular, when the printing device is an inkjet printer as described above, and the black ink is unintentionally used for the glossy paper, the quality of the image is deteriorated. For example, when the glossy paper is placed on the printer, and setting of the printer driver referred to the normal paper, which has priority, the above problem may arise.

SUMMARY OF THE INVENTION

The present invention is advantageous in that there is provided an improved printing system including a computer system and a printing device connected to the computer system, with which a user's intention is reflected and a desired printout can be obtained.

According to an aspect of the invention, there is provided a printing system which is provided with a printing device capable of printing images on a recording sheet, the printing device including a first sheet type setting system that sets first sheet data representing a type of the sheet, a controlling device that controls the printing device to perform a printing operation, the controlling device being capable of communicating with the printing device, the controlling device including a second sheet type setting system that sets second sheet data representing a type of the sheet, and a comparing system that compares the first sheet data with the second sheet data. With this configuration, the printing device performs the printing operation in accordance with a comparison result of the comparing system.

With this configuration, the printing device prints the data in different ways depending on the type of the sheet. Therefore, high image quality can be realized.

Optionally, the printing system may further include a notifying system that issues a predetermined notification when the first sheet data is different from the second sheet data. The notification may be made by sound and/or by displaying an image or message. It should be noted that any other type of notification, e.g., by vibration, or by flashing light, may also be applicable.

In one case, the controlling device may include the notifying system. In this case, the notification is directed to a user operating the controlling device.

Alternatively or optionally, the printing device may include the notifying system. In this case, the notification is directed to the user at the printing device.

Optionally, the printing system may have a sheet type detection sensor. In particular, the first sheet type setting device may include a sheet type detection sensor which detects the type of the sheet. With this configuration, the first sheet data is automatically set in accordance with the detection result of the sensor.

Optionally, if the sheet type detection sensor fails to detect the type of the sheet, the printing device may perform the printing operation in accordance with the second sheet data.

With this configuration, although the actual type of the sheet is unknown, the print operation is anyway performed.

Optionally, the second sheet data may be configured to include data representing a print resolution, and the printing device may be controlled to perform the printing operation in accordance with the second sheet data if the print resolution is a predetermined low resolution, or lower.

When the user selects the low resolution, the user may not pay attention to the image quality. Instead, it is important that the printing operation is performed immediately. With the above configuration, this requirement is satisfied.

Optionally, if the first sheet data represents a default type of the sheet, the printing device performing the printing operation in accordance with the second sheet data.

When the first sheet data represents a default sheet type, user has not changed the setting in the printing device. In such a case, it is preferable that the printing is performed in accordance with the second sheet data, which the user might think is important.

In contrast, if the first sheet data represents a type of the sheet other than a default sheet type, the printing device performing the printing operation in accordance with the first sheet data.

If the first sheet data represents a sheet type other than the default type, the user has changed the setting in the printing device. Therefore, in such a case, it is preferable that the printing is performed in accordance with the first sheet data.

Optionally, the second sheet data includes data representing a print resolution, the printing device performing the printing operation in accordance with the second sheet data if the print resolution is a predetermined low resolution.

In a particular case, the controlling system includes the comparing system, and the controlling system is configured to receive the first sheet data from the printing device, and control the printing device in accordance with comparison result by the comparing system.

In this case, the controlling system may include a priority setting system capable of giving priority to one of the first sheet data and the second sheet data, the controlling device controlling the printing device in accordance with the sheet data that is given priority.

Optionally, if the first sheet data represents a default type of a sheet, the controlling device controls the printing device in accordance with the second sheet data.

According to embodiments, each of the first sheet data and second sheet data includes data representative of a type of paper quality. Alternatively or optionally, each of the first sheet data and second sheet data may include data representative of a size of the sheet.

Alternatively, the printing device may include a comparing system, and the printing device receiving the second sheet data from the controlling device According to another aspect of the invention, there is provided a printing system, which is provided with a printing device capable of printing images on a recording sheet, the printing device including a sheet type detection sensor which detects the type of the sheet, a controlling device that controls the printing device to perform a printing operation, the controlling device being capable of communicating with the printing device, the controlling device including a sheet type setting system that sets sheet data representing a type of the sheet. With this configuration, the sheet data may include data representing a print resolution, the printing device performing the printing operation in accordance with the sheet data if the print resolution is lower than a predetermined resolution, the printing device performing the printing operation in accordance with the detected type of the sheet if the print resolution is not lower than the predetermined resolution.

According to a further aspect of the invention, there is provided a method of printing using a printing system, having a printing device capable of printing images on a recording sheet, the printing device including a first sheet type setting system that sets first sheet data representing a type of the sheet and a controlling device that controls the printing device to perform a printing operation, the controlling device including a second sheet type setting system that sets second sheet data representing a type of the sheet. The method may include comparing the first sheet data with the second sheet data, and performing the printing operation in accordance with a comparison result.

The method may be provided in a form of computer programs executed by the printing device and/or the computer system constituting a printing system. Such programs may be distributed via recording medium such as a CD-ROM, or via a network system such as the Internet.

DETAILED DESCRIPTION OF THE EMBODIMENT

Hereinafter, exemplary embodiments of the invention will be described with reference to the accompanying drawings.

Figure 1:
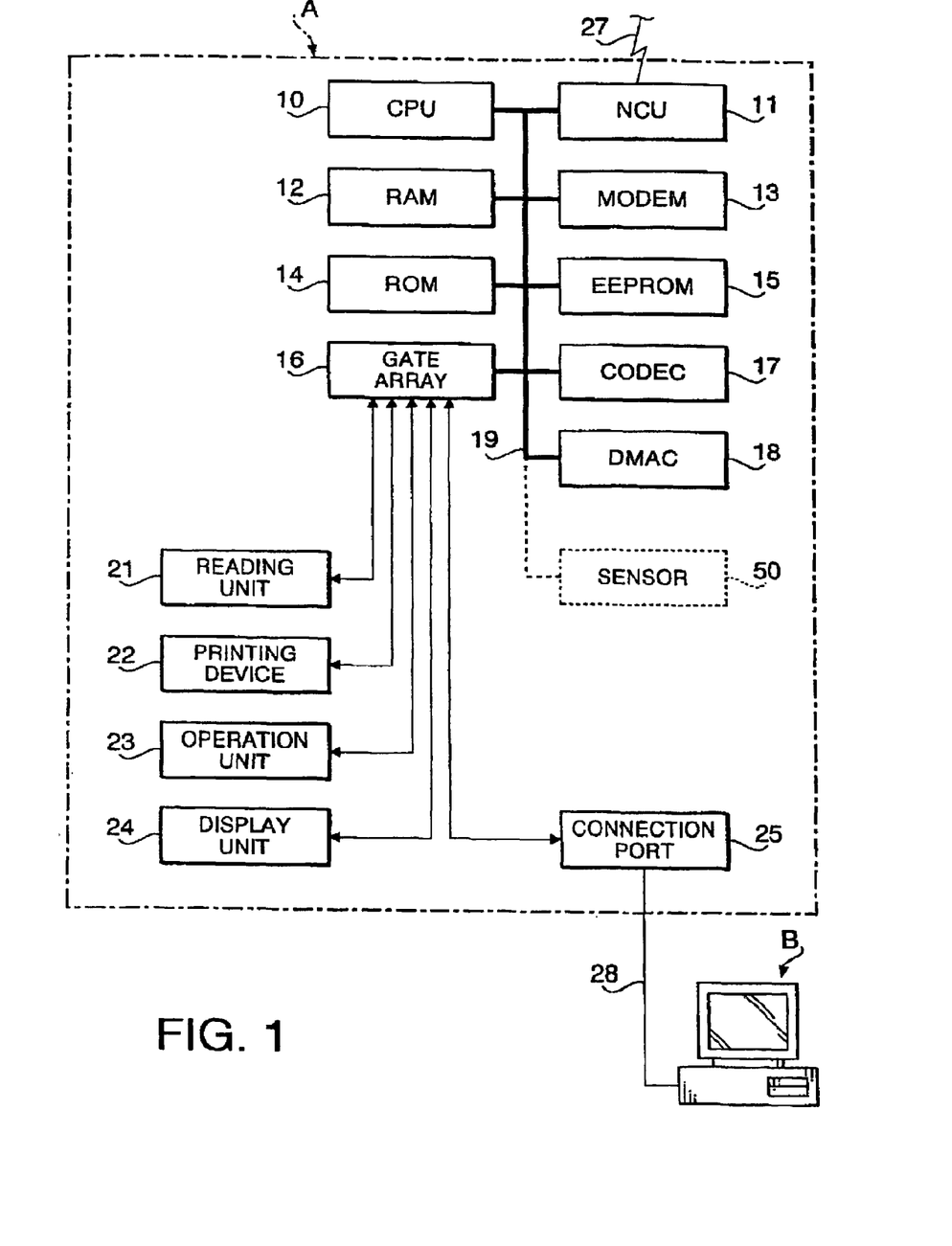
FIG. 1 shows a block diagram of a printing device included in a printing system according to an embodiment of the invention.
Figure 2:
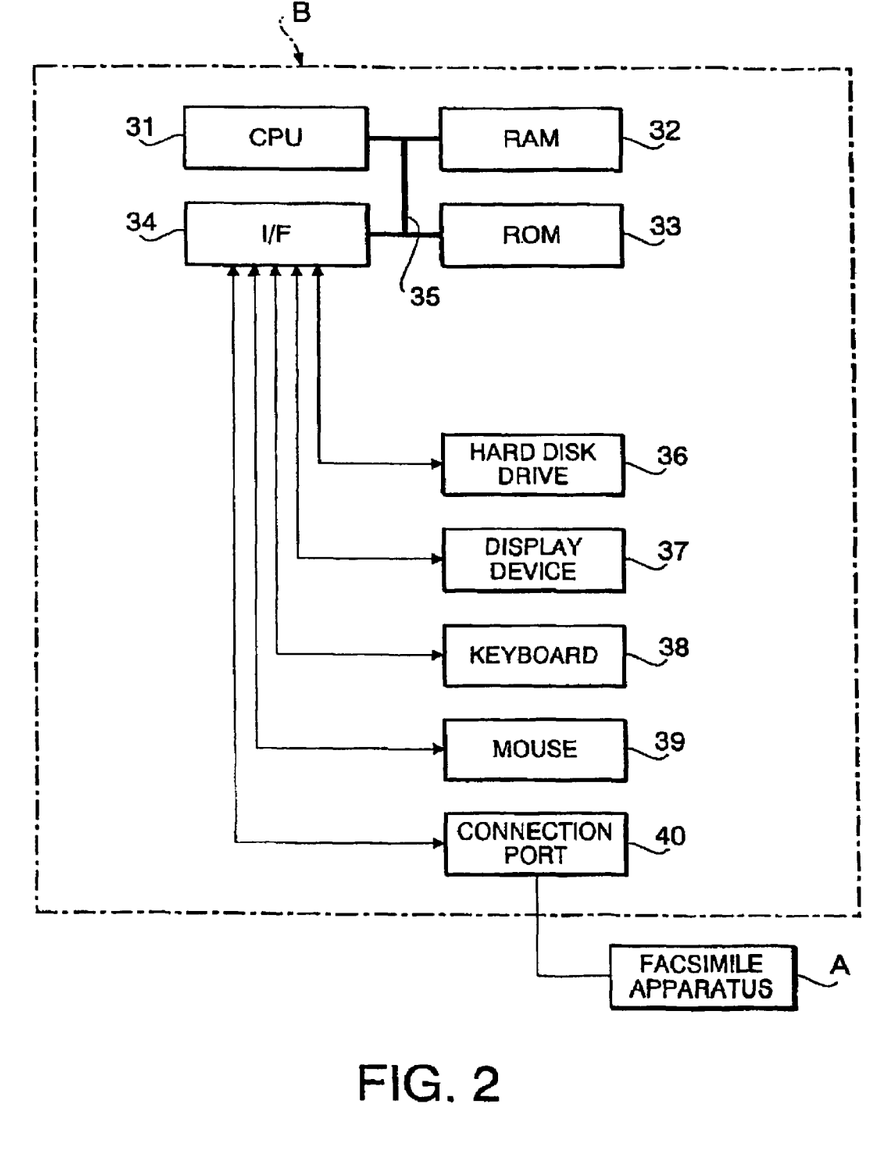
FIG. 2 is a block diagram of a computer system included in the printing system according to the embodiment.

FIGS. 1 and 2 show a configuration of a printing system, which includes a facsimile apparatus A and a computer system B, according to an embodiment of the invention. FIG. 1 is a block diagram showing electronic configuration of the facsimile apparatus A in detail.

As shown in FIG. 1, the facsimile apparatus A is provided with a CPU (Central Processing Unit) 10, an NCU (Network Control Unit) 11, a RAM (Random Access Memory) 12, a modem 13, a ROM (Read Only Memory) 14, an EEPROM (Electronically Erasable Programmable ROM) 15, a gate array 16, a codec 17, a DMAC (Direct Memory Access Controller) 18, a reading unit 21, a printing device 22, an operation unit 23, a display unit 24 and a connection port 25. The CPU 10, the NCU 11, the RAM 12, the modem 13, the ROM 14, the EEPROM 15, the gate array 16, the codec 17 and the DMAC 18 are interconnected through a bus 19, which includes address bus, data bus and control signal lines. The reading unit 21, the printing device 22, the operation unit 23, the display unit 24 and the connection port 25 are connected to the gate array 16. The NCU 11 is connected with a public telephone line 17. The facsimile apparatus A is connected to the computer system B through a connection port 25 by a connection cable 28.

In FIG. 1 a sensor 50 is indicated by broken lines. The sensor 50 is employed in a second embodiment, but not in the first embodiment. Therefore, the sensor 50 will be described later.

The CPU 10 controls the entire operation of the facsimile apparatus A. The NCU 11 controls a connection through the public telephone line 27. The RAM provides work area for the CPU 10 and temporarily stores data. The modem 13 performs modulation/demodulation of facsimile data to be sent/received through the public telephone line 27. The ROM 14 stores programs to be performed by the CPU 10. The EEPROM 15 is used for storing various data. In particular, according to the embodiment, the EEPROM 15 has an area for storing various pieces of sheet type data, which includes types of a sheet (e.g., a normal paper, a paper for an inkjet printer, a glossy paper, an OHP paper and the like). The type of the sheet can be set using sheet setting buttons 26A and 26B which will be described later. The gate array 16 functions as an interface between the CPU 10 and the units 21-24. The codec 17 performs encoding/decoding the facsimile data or the like. The DMAC 18 mainly performs reading/writing data with respect to the RAM 12.

The reading unit 21 includes a scanner, which scans an image on an original under control of the CPU 10. The printing device 22 includes an inkjet printer, which performs the printing operations under control of the CPU 10 to form color and/or black-and-white images.

Figure 3:
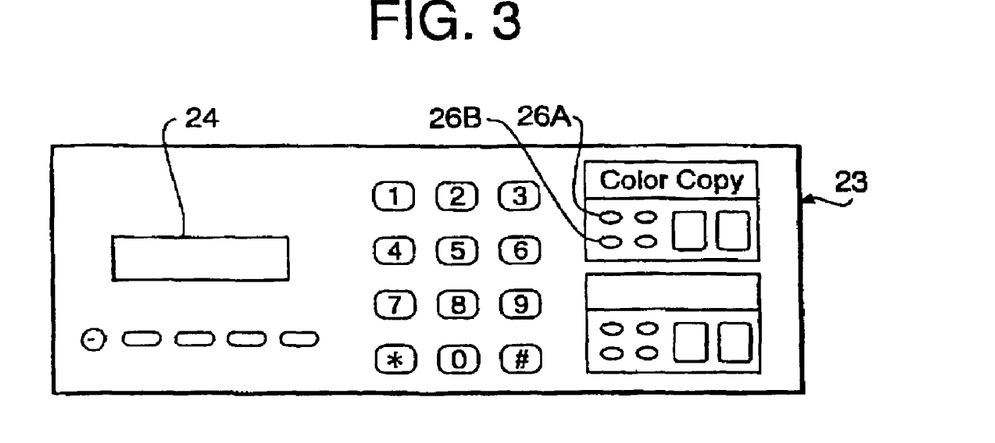
FIG. 3 schematically shows an operation panel of the printing device.

The operation unit 23 is provided with a numeric keypad, and various other operation keys for inputting a user's operation to the CPU 10. FIG. 3 shows an arrangement of the keys of the operation unit 23. It should be noted that the operation unit 23 is provided with a sheet type setting button 26A and a sheet size setting button 26B. Upon operation of the sheet type setting button 26A, a sheet type (i.e., a normal paper, a paper for an inkjet printer, a glossy paper, an OHP paper and the like) are displayed one by one on a display unit 24. The user can select a desired sheet type by operating the sheet type setting button 26A with reference to the sheet type displayed on the display unit 24. Similarly, by operating the sheet size setting button 26B, the size of the sheet can be selected.

The display unit 24 includes an LCD, which displays various pieces of information including operation status of the facsimile apparatus A, operation guidance and the like as well as the sheet type and sheet size as mentioned above.

The connection port 25 is used when the facsimile apparatus A is used as a peripheral apparatus for the computer system B. As described above, the connection port 25 and the computer system B are connected by the connection cable 28, through which data is exchanged between the facsimile apparatus A and the computer system B.

FIG. 2 shows a block diagram of the computer system B, which functions as a control system of the facsimile apparatus A when connected by the cable 28.

As shown in FIG. 2, the computer system B includes a CPU 31, a ROM 32, a RAM 33 and an I/F (Interface) unit 34, which are interconnected through a bus 35. The CPU 31 is connected, via the I/F unit 23, with a hard disk drive 36, a display device 37, a keyboard 38, a mouse 39 and a connection unit 40.

The CPU 31 controls the entire operation of the computer system B. The CPU 31 performs various operations in accordance with the programs stored in the hard disk drive 36, and in response to operation input of a user through the keyboard 38 and the mouse 39.

The RAM 33 provides a working area for the CPU 31. The hard disk drive 36 stores programs to be executed by the CPU 31, and various pieces of data. In particular, in the embodiment, the hard disk drive 36 stores printer setting data to be referred to for printing in a form of a printer driver.

Figure 4:
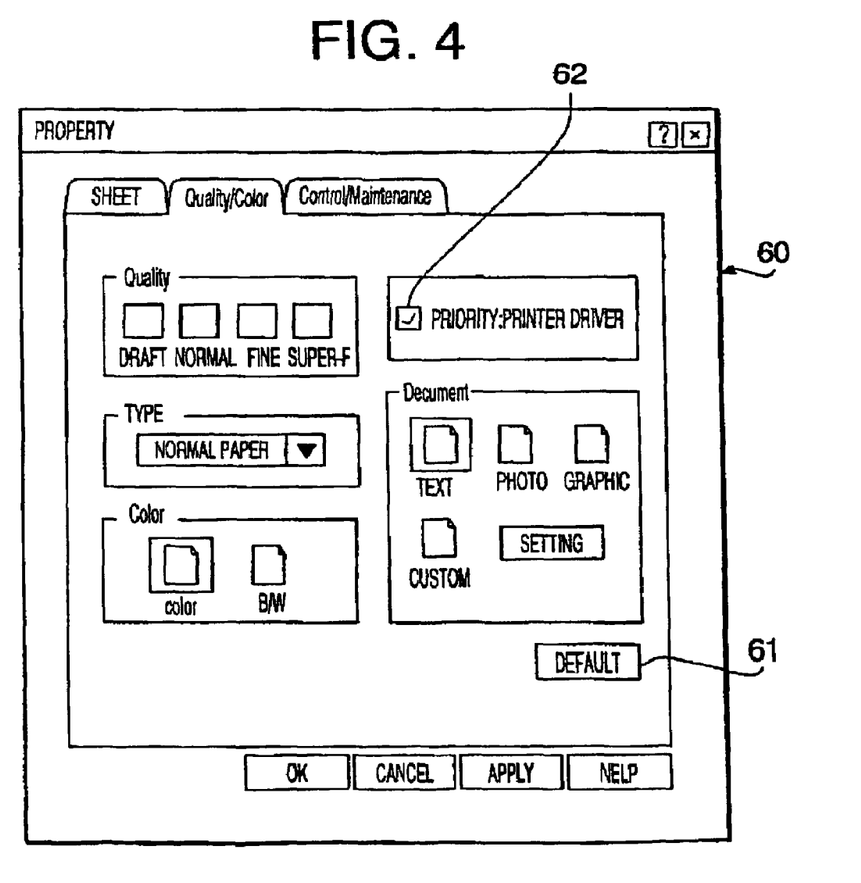
FIG. 4 is shows a printer property setting dialog displayed on a display unit of the computer system.

When the user desires to change the printer setting, by actuating the printer driver to display a property setting dialog 60 on the display device 27 as shown in FIG. 4. Using the mouse 39 and the keyboard 38, the user can change the printer property setting, which includes sheet type setting, printing quality/color setting, and control/maintenance setting. It should be noted that the printer driver has a standard (or default) setting, which is applied by clicking a "DEFAULT" setting button 61 in the printer property setting dialog. In the property setting dialog 60, the user can set whether the setting of the printer driver or the setting of the printer is given priority by checking/removing a check mark in a check box 62 at the "PRIORITY: PRINTER DRIVER".

According to the embodiment, when a printing operation is performed, it is examined whether a type of a sheet set in the printing device 22 and a type of a sheet set in the printer driver are compared, and the printing operation is controlled in accordance with the comparison result. This characteristic feature will be further described with reference to the flowchart shown in FIG. 5.

Figure 5:
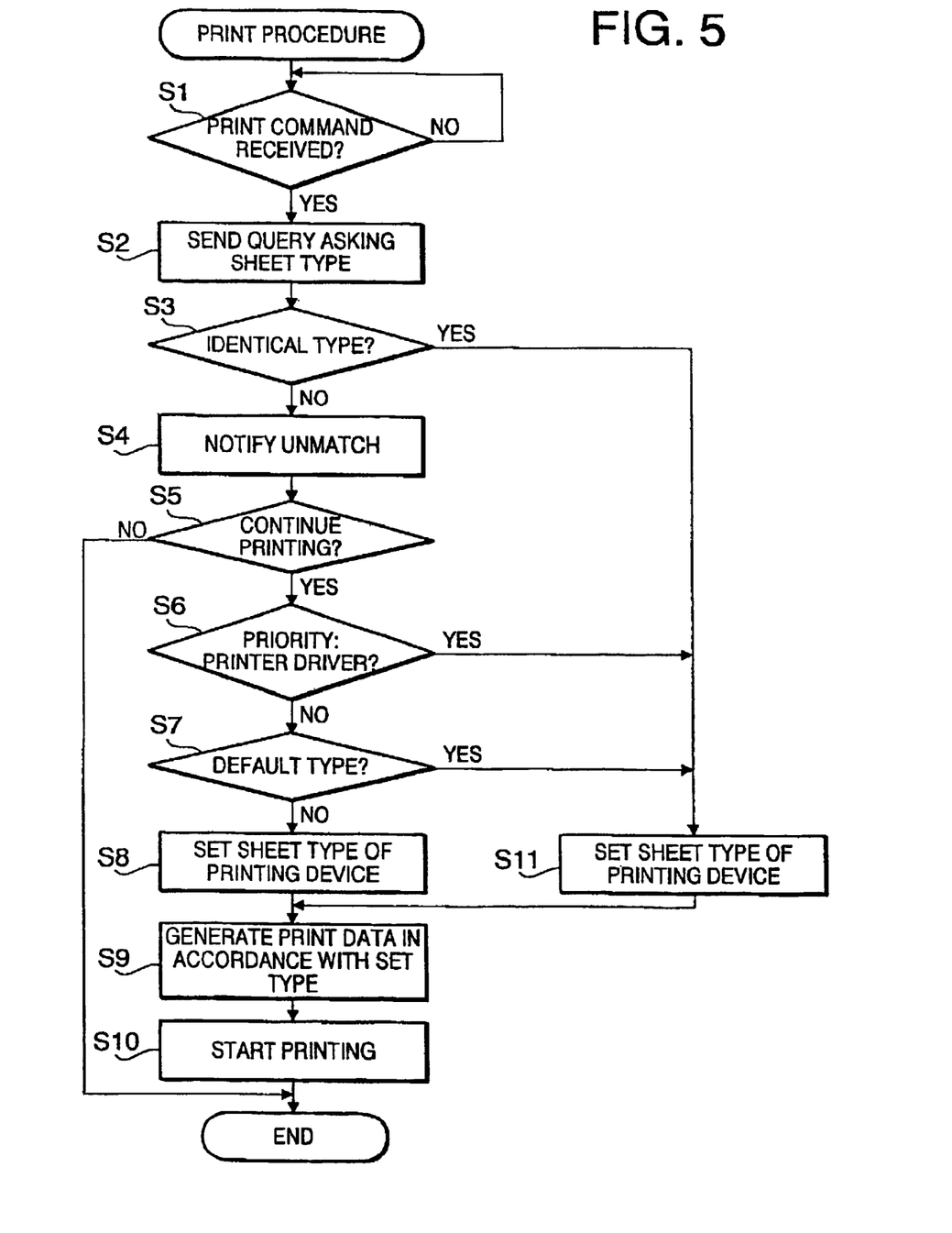
FIG. 5 is a flowchart illustrating a print procedure executed by a CPU of the computer system.

FIG. 5 is a flowchart illustrating a printing procedure executed by the CPU 31 of the computer system B.

At an initial stage, the CPU 31 checks whether a print start command is input by the user through the keyboard 38 or the mouse 39 (S1). If the print start command is received (S1: YES), control proceeds to S2. It should be noted that, the user generally input the sheet setting of the printer driver in the printer property dialog described above before inputting the print start command. Otherwise, the default setting of the printer property is used as the sheet setting of the printer driver.

In S2, the CPU 31 transmits query to the printing device 22 (i.e., the facsimile apparatus A) in order to obtain the sheet setting in the printing device 22. The printing device 22 (i.e. the facsimile apparatus A) retrieves the sheet setting data stored in the EEPROM 15, and transmits the data to the computer system B. If the user has changed the sheet setting in the printing device 22, for example, from the normal paper to the glossy paper, the data indicating that the type of the sheet is the glossy paper is transmitted from the facsimile apparatus A to the computer system B.

The CPU 31 compares the received sheet type data with the setting of the printer driver (S3). If the settings are not identical (S3: NO), the CPU 31 notifies that the settings are different by displaying a message on the display device 37 (S4). Alternatively or optionally, the notification may be made by sound. It should be noted that various alternatives of the notification may be used. For example, a color of a part of an image displayed on the display device 37 may be changed, or at least a part of the display screen is blinked. The notification may be made also in the facsimile apparatus A visually and/or by sound.

Figure 7:
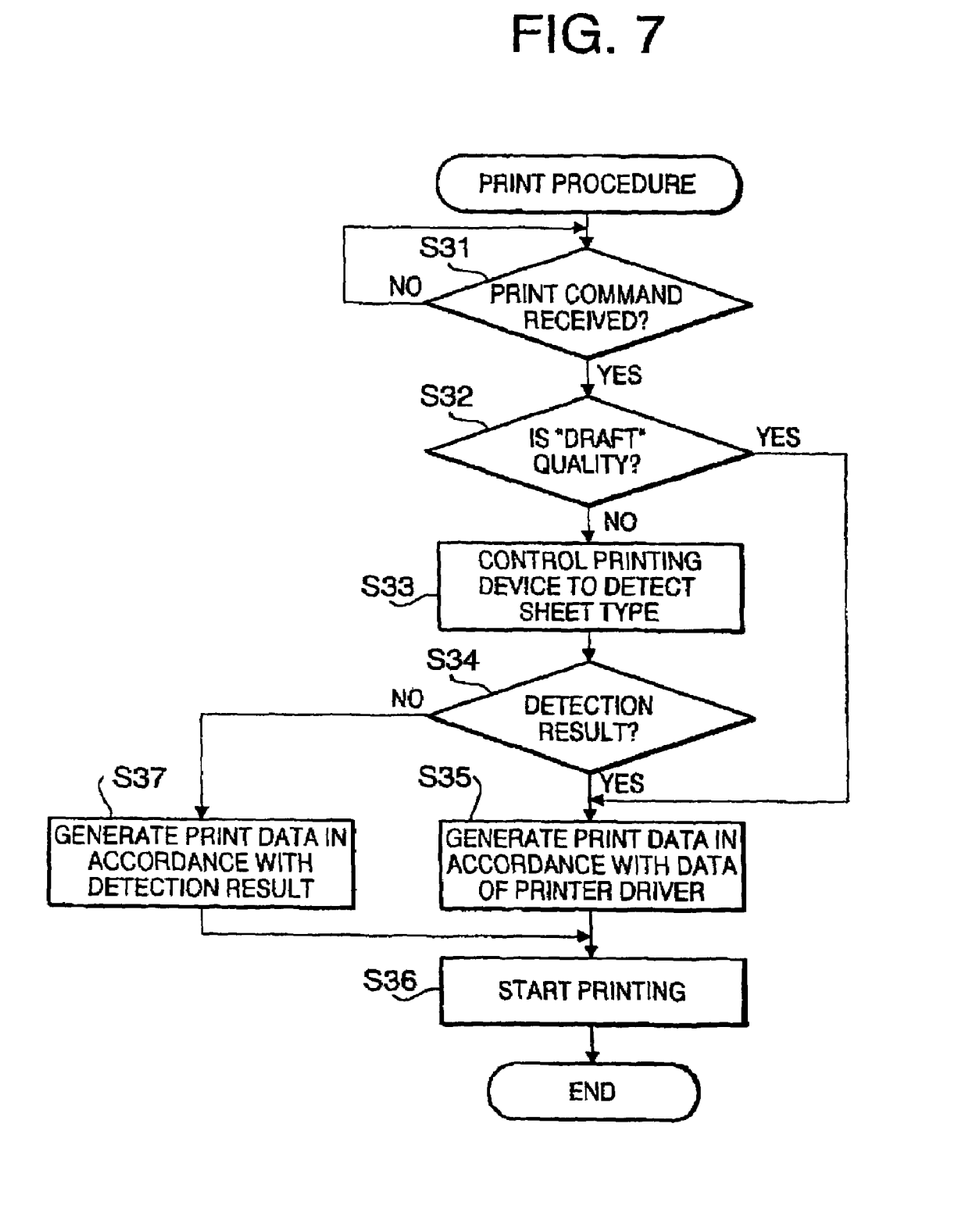
FIG. 7 is a flowchart illustrating a print procedure executed by the CPU of the computer system according to a modified embodiment.

After the notification is issued, the CPU 31 displays a dialog asking the user whether the printing operation should be continued or terminated (S5). If the user decides not to continue the printing operation (S5: NO), the procedure shown in FIG. 7 is terminated. If the user decides to continue the printing operation by performing a predetermined operation (S5: YES), control proceeds to S6, where the CPU 31 judges whether the setting of the printer driver is given a priority. As described above, if the user has inserted the check mark in the check box 62 at the "PRIORITY: PRINTER DRIVER" in the printer property setting dialog 60 (see FIG. 4), the CPU 31 judges that the setting of the printer driver is given priority (S6: YES), and control proceeds to S11. Since the printer driver has priority, the sheet type setting of the printer driver is used (S1). Otherwise (S6: NO), control proceeds to S7.

When control proceeds from S6 to S7, i.e., the setting of the printer driver does not have priority, the CPU 31 judges whether the sheet setting in the printing device 22, which has been received in response to the query issued at S2, is a default setting, which typically indicates the normal paper.

If the sheet setting of the printing device 22 is the default setting (S7: YES), control proceeds to S11. It should be noted that, if the sheet setting of the printing device 22 is the default setting, it means that the user has not changed the sheet setting in the printing device 22. In this case, even though the printer driver is not given priority, the sheet setting of the printer driver is used (S11).

If the sheet setting of the printing device 22 is not the default setting (S7: NO). the sheet setting of the printing device 22 is used (S8).

In S9, print data to be transmitted to the printing device 22 is generated in accordance with the sheet setting determined in S8 or S11. Then, in S11, the generated print data is transmitted to the printing device 22 as well as a print start command.

Figure 6:
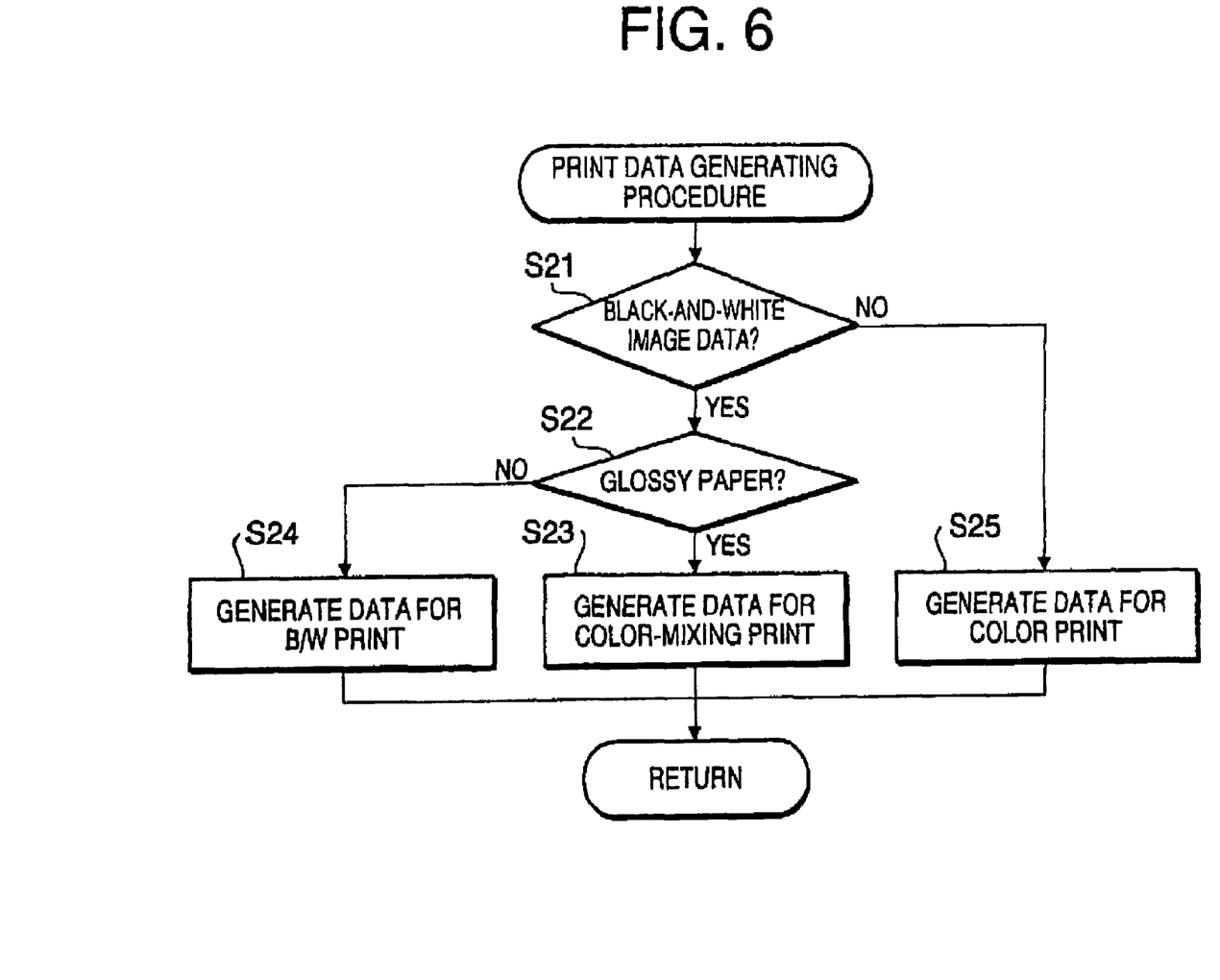
FIG. 6 is a flowchart illustrating a print data generating procedure executed by the CPU of the computer system.

FIG. 6 is a flowchart of an example of a procedure of generating print data, which is executed in S9 of the flowchart shown in FIG. 5 as a subroutine. The flowchart shown in FIG. 6 corresponds to a case where an image to be printed is a black-and-white image or a color image, and the sheet type is a normal paper or a glossy paper.

In S21, the CPU 31 judges whether an image to be printed is a black-and-white image or a color image. If a color image is to be printed (S21: NO), control proceeds to S25, where the color image data is generated. If a black-and-white image is to be printed (S21: YES), it is judged whether the sheet is a glossy paper (S22). As aforementioned, if the black ink is used for the glossy paper, the ink does not dry quickly and deteriorates the image quality. Therefore, if the image is to be printed on the glossy paper (S22: YES), the print data for a color-mixing mode print is generated, that is, the print data is generated such that the cyan, yellow and magenta inks are used for forming the black-and-white image (S23).

If the sheet type is not a glossy paper (S22: NO), control proceeds to S24, where the print data is generated such that the black-and-white image is formed using the black ink.

Assuming that the glossy paper is set in the facsimile apparatus A, and the computer system B starts printing a black-and-white image with the normal paper setting, then the CPU 31 detects the unmatch of the sheet settings in S3 of FIG. 5. In such a case, if the printer driver does not have a priority, i.e., the check box in the printer driver setting dialog is not checked, control proceeds from S6 to S9 through S7 and S8, and the print data is generated such that the three color inks are used for forming the black-and-white image. Thus, the problem when the black ink is used for the glossy paper can be avoided.

As describe above, according to the procedure shown in FIG. 5. if the user has selected the sheet type with sheet type setting button 26*a* of the operation unit 23, the selected sheet type is given priority when the printing operation is performed. Accordingly, with the above-described printing system, the user's desired printing operation is carried out appropriately, in accordance with the user's selection, which provides the user secure feeling.

If the sheet type has not been set in the printing device 22 (i.e., the facsimile apparatus A), the sheet setting of the printer driver is given priority since S11 must be executed, i.e., control proceeds from S3, S6 or S7 to S11.

Further, the user generally changes the sheet setting before inputting the print start command, which is generally carried out using the printer driver property setting dialog 60 and may not be performed at the printing device 22 (i.e., the facsimile apparatus A). If the user changes the sheet setting of the printer driver, even if the priority is not given to the printer driver, control proceeds from S6 to S11, or from S7 to S11. Thus, also in this case, the printing operation is carried out in accordance with the user's setting.

Alternatively, the sheet type settings may be synchronized between the printing device 22 (i.e., the facsimile apparatus A) and the computer system B. That is, the printing system may be configured such that the sheet setting data of the printer driver is transmitted to the printing device when the computer system B is powered on or a printing operation is finished. With such a configuration, the sheet setting data is commonly owned by the printing device 22 and the computer system B. Then, whichever data is given priority, the same printing result can be obtained.

The sheet setting data may be reset to the default data when the sheet is manually fed, or a paper tray of the facsimile apparatus A is withdrawn/inserted for filling the sheet or exchanging the sheet. Optionally, in such a case, the printing system may be configured such that the printing device 22 (i.e., the facsimile apparatus A) or the computer system B requires the user to enter new sheet type setting. Further, the printer driver property setting dialog 60 may be provided with an item for giving priority to the setting in the printing device 22.

FIG. 7 is a flowchart illustrating a print procedure performed by the CPU 31, according to a second embodiment. In the second embodiment, the printing device 22 (i.e., the facsimile apparatus A) is further provided with the sheet sensor 50, which is indicated by broken lines in FIG. 1. The sensor 50 is also connected to the CPU 31 through the bus 19, and is configured to detect the type of the sheet based on the reflectivity of the sheet. An example of a device for identifying a sheet type of a recording paper is disclosed in European Patent application No. EP-1034937-A3, teachings of which are incorporated herein by reference.

In S31, the CPU 31 examines whether a print start command is input or not. If the user inputs the command (S31: YES) through the keyboard 38 or mouse 39, the CPU 31 refers to the sheet setting data of the printer driver and judges whether the print quality is set to "DRAFT" (e.g., a low resolution such as 180 dpi) which is set in the printer driver property dialog shown in FIG. 4 (S32).

If the print quality is set to "DRAFT" (S32: YES), control proceeds to S35. In S35, the CPU 31 generate print data in accordance with the sheet setting of the printer driver, and transmits the print data as well as the print start command to the printing device 22 (i.e., the facsimile apparatus A) (S36). Thus, when the print quality is set to the draft quality, the print data is generated in accordance with the sheet setting of the printer driver regardless of the type of the sheet actually loaded in the printing device 22 (i.e., the facsimile apparatus A). When the user has selected the draft quality, it is likely that the user intends only to know the contents of the printout and the quality is not important. Therefore, according to the embodiment, when the draft mode is set, the printing device 22 is controlled to print the data immediately and reduce the printing time. It should be noted that the judgment in S32 may be modified to examine whether the resolution is lower than a predetermined value or not.

If the print quality is not set, for example, to "FINE" (e.g., 360 dpi) but not to "DARAFT" (S32: NO), the CPU 31 transmits an instruction to the printing device 22 to detects the type of the loaded sheet using the sensor 50 (S33). Upon reception of such an instruction, the CPU 10 of the facsimile apparatus A detects the type of the sheet, and transmits the detected results to the computer system B. It should be noted that the detected results may include the detected type of the sheet or the detection is failed.

The CPU 31 of the computer system B then examines the detection result in S34. If the detection was failed (S34: YES), the CPU 31 proceeds to S35. In S35, the CPU 31 generates print data in accordance with the sheet setting of the printer driver, and transmits the print data as well as the print start command to the printing device 22 (i.e., the facsimile apparatus A) (S36).

If the detection was successful, and the type of the sheet has been received, the CPU 31 generates the print data in accordance with the detected type of the sheet (S37), and transmits the print data as well as the print start command to the printing device 22 (i.e., the facsimile apparatus A) (S36).

The print data generating procedure shown in FIG. 6 may be applicable to step S35 or S37 of the print procedure shown in FIG. 7. It should be noted, however, the procedure shown in FIG. 7 is only an exemplary procedure, and various modifications should be employed depending on individual printing systems.

It should be noted that the procedure shown in FIG. 7 may be modified such that the decision in S32 is changed to judge whether the sheet settings of the printer driver and the printing device are identical or not, as in S3 of the flowchart shown in FIG. 5.

As described above, according to the second embodiment, since the sheet type is detected using the sensor, and the print data is generated in accordance with the detected sheet type, appropriate print data is always generated. Further, if the sheet type cannot be detected, the print data is generated in accordance with the setting of the printer driver. Thus, even if the sheet type is unknown, it is ensured that the data is printed. Furthermore, if the user intends to the draft printout, the sheet detection is skipped and the data is printed immediately so that the waiting time of the user is reduced.

It should be noted that the first and second embodiments are described as separate embodiments, at least a part of each procedure may be combined. For example, a step similar to S32 of FIG. 7 may be inserted between steps S2 and S3 of FIG. 5, and the procedure is modified such that if the "DRAFT" mode is selected, control proceeds to S11, otherwise to S3.

The invention is not limited to the configuration described above with reference to the embodiments and modifications. Further modifications may be provided without departing from the scope of the invention.

For example, the procedure shown in FIG. 5 may be modified such that when the settings of the printer driver and the printing device 22 are different (S3: NO), and notification is issued (S4), the procedure is paused and requires the used to confirm or change the settings.

For another example, the procedure shown in FIG. 5 is modified such that the procedures similar to those of S3 onwards are performed by the CPU 10 of the facsimile apparatus instead of the CPU 31 of the computer system B.

Figure 8:
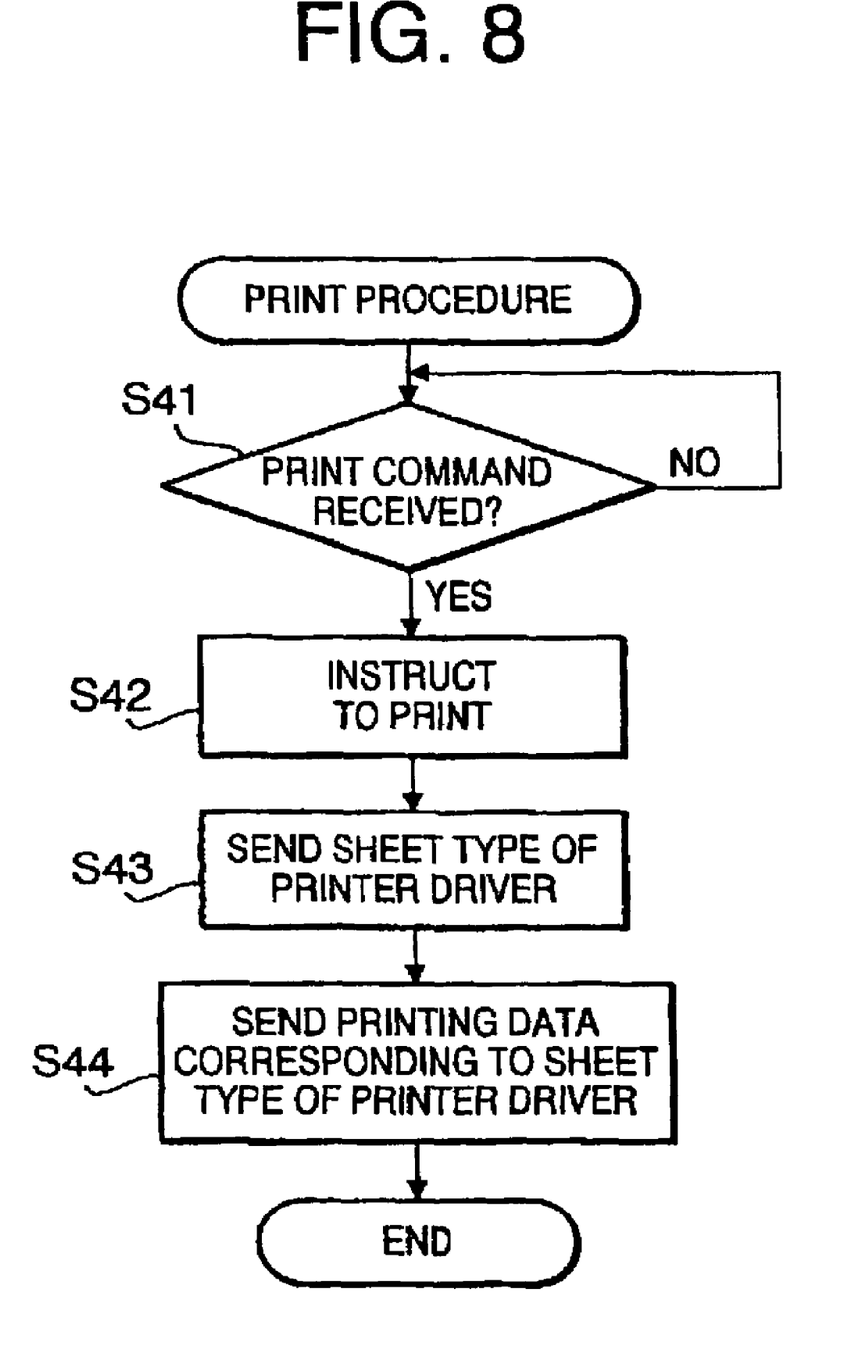
FIG. 8 is a flowchart illustrating a printing operation executed by a CPU of the computer system according to another modified embodiment.
Figure 9:
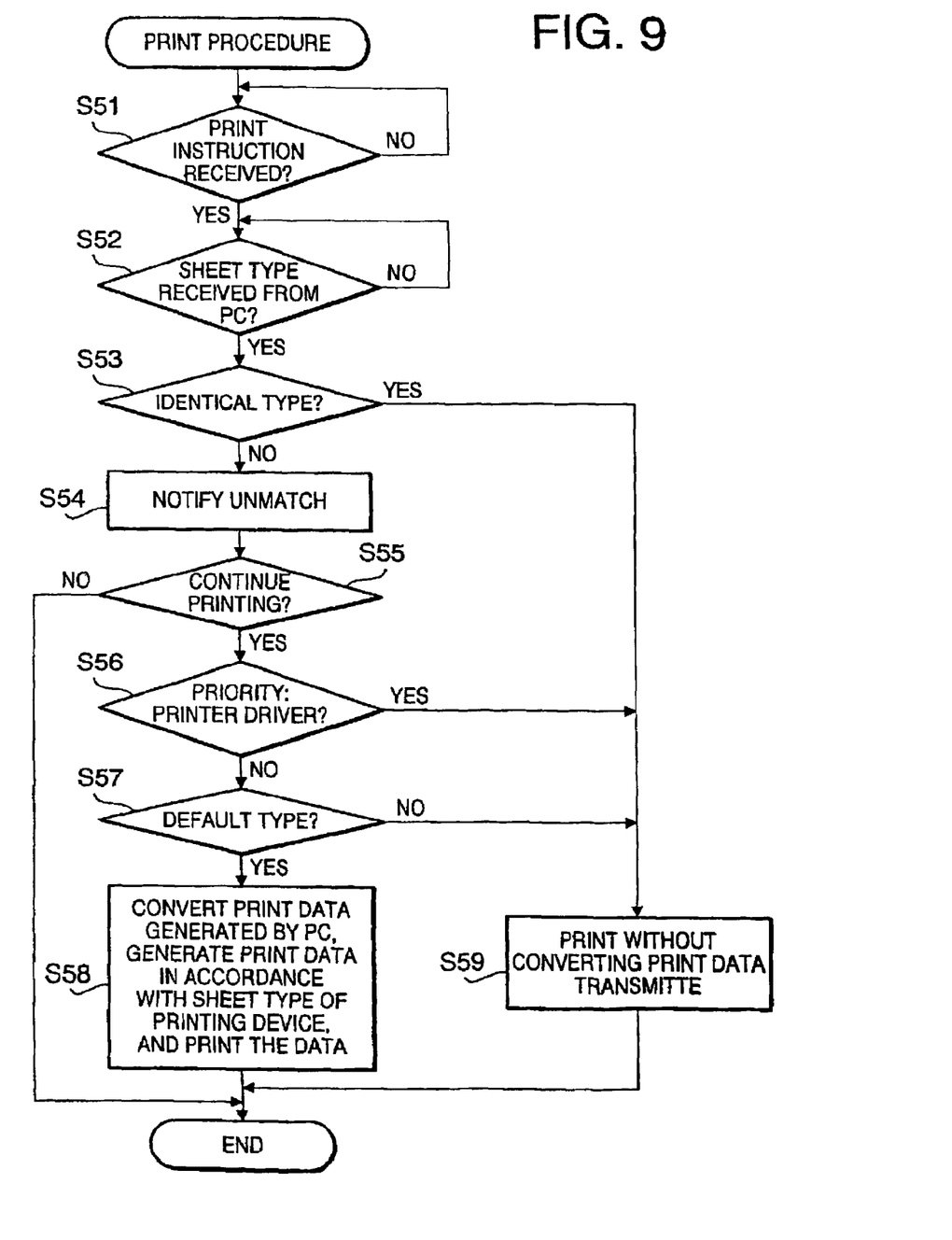
FIG. 9 is a flowchart illustrating a printing operation executed by the CPU of the printing device according to an alternative embodiment.

FIGS. 8 and 9 shows flowcharts respectively illustrating procedures performed by the CPU 31 and CPU 10 for such a configuration.

FIG. 8 is a flowchart illustrating a printing procedure executed by the CPU 31 of the computer system B.

At an initial stage, the CPU 31 checks whether a print start command is input by the user through the keyboard 38 or the mouse 39 (S41). If the print start command is received (S41: YES), control proceeds to S42. In this modified embodiment, since the facsimile apparatus converts print data in accordance with the setting thereof, if necessary. Therefore, when CPU 31 detects that reception of the print start command (S41: YES), the CPU 31 send an instruction to the facsimile apparatus A to start printing (S42). Then, the CPU 31 sends sheet setting data of the printer driver (S43) and print data corresponding to the sheet setting data of the printer driver (S44).

FIG. 9 shows a print procedure performed by the CPU 10 of the facsimile apparatus A in accordance with the modified embodiment.

In S51, the CPU 10 judges whether the print start instruction, which is sent from the CPU 31 in S42 (see FIG. 8). is received. If the instruction is received (S51: YES), the CPU 10 waits for the transmission of the sheet type of the printer driver, which is sent from the CPU 31 in S43 (see FIG. 8). If the sheet type of the printer driver is received (S52: YES), the CPU 10 checks whether the sheet setting of the printer driver of the computer system B is identical to that of the printing device 22.

If the sheet settings are identical (S53: YES), the CPU 10 performs a printing operation in accordance with the sheet setting of the printer driver of the computer system B (S59). That is, the facsimile apparatus A performs the print procedure in accordance with the data transmitted from the computer system B without modifying the same.

If the sheet settings are different (S53: NO), the CPU 10 notifies that the settings are different by displaying a message on the display unit 24 (S54). Alternatively or optionally, the notification may be made by sound. It should be noted that various alternatives of the notification may be used. The notification may be made also in the computer system B visually and/or by sound.

After the notification is issued, the CPU 10 displays a dialog asking the user whether the printing operation should be continued or terminated (S55). If the user operates a key instructing not to continue the printing operation (S55: NO), the procedure shown in FIG. 9 is terminated. If the user operates another key instructing to continue the printing operation (S55: YES), control proceeds to S56, where the CPU 10 judges whether the setting of the printer driver is given a priority. It should be noted that this information may be transmitted from the computer system B together with the sheet type setting or the print data (S43 or S44 of FIG. 8). If the user has inserted the check mark in the check box 62 at the "PRIORITY: PRINTER DRIVER" in the printer property setting dialog 60 (see FIG. 4), the CPU 10 judges that the setting of the printer driver is given priority (S6: YES), and control proceeds to S59. Since the printer driver has priority, the printing operation is performed in accordance with the sheet type setting of the printer driver (S59). Otherwise (S56: NO), control proceeds to S57.

When control proceeds from S56 to S57, i.e., the setting of the printer driver does not have priority, the CPU 10 judges whether the sheet setting of the printer driver, which has been received in S52, is a default setting, which typically indicates the normal paper.

If the sheet setting of the printer driver is the default setting (S57: YES), the CPU 10 determines that the sheet setting of the printing device 22 should be used. In this case, control proceeds to S58. It should be noted that, if the sheet setting of the printer driver of the computer system B is the default setting, it means that the user has not changed the sheet setting in the computer system B. In this case, even though the printer driver is not given priority, the sheet setting of the printing device is used. Accordingly, in S58, the print data transmitted from the computer system B is converted so as to meet the sheet setting of the printing device 22, and the printing operation is performed with the converted data and the sheet setting of the printing device 22.

If the sheet setting of the printer driver is not the default setting (S57: NO), the sheet setting of the printer driver is used. That is, in S59, print data transmitted from the computer system B is used.

In the above-described embodiments and modifications, the printing device implemented in the facsimile apparatus A is referred to. However, the invention is not limited to such a configuration, and the printing device may be a stand-alone printing device, or implemented in another device.

In the above-described embodiments and modifications, the printing system is described such that a printing device is directly connected with a computer system. This can be modified such that the printing device may be connected with one or more computer systems through a network system.

The present disclosure relates to the subject matter contained in Japanese Patent Application No. 2001-257691 filed on Aug. 28, 2001, which is expressly incorporated herein by reference in its entirety.

What is claimed is:

1. A printing system, comprising:
a printing device capable of printing images on a recording sheet, the printing device including a first sheet type setting system that sets first sheet data representing a type of the sheet;
a controlling device that controls the printing device to perform a printing operation, the controlling device being capable of communicating with the printing device, the controlling device including a second sheet type setting system that sets second sheet data representing a type of the sheet;
a comparing system that compares the first sheet data with the second sheet data; and
an operating sheet data determining system configured to determine, in accordance with a comparison result of the comparing system, operating sheet data representing the type of the sheet to be referred to when the printing operation is performed,
the printing device performing the printing operation in accordance with the operating sheet data,
wherein the controlling device includes the comparing system, the controlling device receiving the first sheet data from the printing device, the controlling device controlling the printing device in accordance with the comparison result of the comparing system,
wherein the controlling device includes a priority setting system capable of giving priority to one of the first sheet data and the second sheet data, the controlling device controlling the printing device in accordance with the sheet data that is given priority, and
wherein if the first sheet data is given priority, the printing device performs the printing operation in accordance with the second sheet data set by the second sheet type setting system of the controlling device if the first sheet data is different from the second sheet data and if the first sheet data matches a predetermined condition.

2. The printing system according to claim 1, further including a notifying system that issues a predetermined notification when the first sheet data is different from the second sheet data.

3. The printing system according to claim 2, wherein the notifying system notifies by sound.

4. The printing system according to claim 2, further including a display unit, the notifying system notifies by displaying an image on the display unit.

5. The printing system according to claim 2, wherein the controlling device includes the notifying system.

6. The printing system according to claim 2, wherein the printing device includes the notifying system.

7. The printing system according to claim 1, wherein if the first sheet data represents a default type of the sheet, the printing device performs the printing operation in accordance with the second sheet data.

8. The printing system according to claim 1, wherein if the first sheet data represents a type of the sheet other than a default sheet type, the printing device performs the printing operation in accordance with the first sheet data.

9. The printing system according to claim 1, wherein each of the first sheet data and second sheet data includes data representative of a type of paper quality.

10. The printing system according to claim 1, wherein each of the first sheet data and second sheet data includes data representative of a size of the sheet.

11. The printing system according to claim 1, further including printing data that is generated from the operating data.

12. A method of printing using a printing system having a printing device capable of printing images on a recording sheet, the printing device including a first sheet type setting system that sets first sheet data representing a type of the sheet and a controlling device that controls the printing device to perform a printing operation, the controlling device including a second sheet type setting system that sets second sheet data representing a type of the sheet, the method comprising:
comparing the first sheet data with the second sheet data;
determining in accordance with a comparison result, operating sheet data representing the type of the sheet to be referred to when the printing operation is performed; and
performing the printing operation in accordance with the operating sheet data,
wherein the controlling device compares the first sheet data with the second sheet data, the controlling device receiving the first sheet data from the printing device, the controlling device controlling the printing device in accordance with the comparison result,
wherein the controlling device gives priority to one of the first sheet data and the second sheet data, the controlling device controlling the printing device in accordance with the sheet data that is given priority,
wherein if the first sheet data is given priority, the printing device performs the printing operation in accordance with the second sheet data set by the second sheet type setting system of the controlling device if the first sheet data is different from the second sheet data and if the first sheet data matches a predetermined condition.

* * * * *